United States Patent [19]

Hendriks et al.

[11] Patent Number: 5,743,950
[45] Date of Patent: Apr. 28, 1998

[54] PROCESS FOR PREPARING AN ASPHALT COMPOSITION

[75] Inventors: Henricus Engelbertus Johannes Hendriks; Dirk Adriaan Stoker, both of Amsterdam, Netherlands

[73] Assignee: Shell Oil Company, Houston, Tex.

[21] Appl. No.: 755,996

[22] Filed: Nov. 25, 1996

[30] Foreign Application Priority Data

Jan. 12, 1995 [EP] European Pat. Off. .............. 95308681

[51] Int. Cl.[6] .................................................... C08L 95/00
[52] U.S. Cl. ...................... 106/281.1; 106/277; 106/283; 106/284; 524/59; 524/64; 524/66
[58] Field of Search ................................ 106/273.1, 277, 106/281.1, 276, 284, 283; 404/17; 524/59, 64, 66

[56] References Cited

U.S. PATENT DOCUMENTS

| | | | |
|---|---|---|---|
| 3,832,200 | 6/1972 | Kennel et al. | 106/281 R |
| 4,373,961 | 2/1983 | Stone | 106/277 |
| 5,114,483 | 5/1992 | Graf | 106/277 |

FOREIGN PATENT DOCUMENTS

4308567 C1  8/1994  European Pat. Off. .

*Primary Examiner*—Michael Marcheschi
*Attorney, Agent, or Firm*—Donald F. Haas

[57] ABSTRACT

The present invention provides a process for preparing a dense-graded asphalt composition which comprises adding a hard binder component to a mixture of a soft binder component and aggregate at a temperature of less than 140° C.

7 Claims, No Drawings

PROCESS FOR PREPARING AN ASPHALT COMPOSITION

FIELD OF THE INVENTION

The present invention relates to a process for preparing an asphalt composition for road applications.

BACKGROUND OF THE INVENTION

The temperature at which a bitumen is mixed with aggregate to produce an asphalt composition ready for use on roads is normally in the range of 140° to 170° C., although some documents, e.g. U.S. Pat. No. 3,832,200, teach that even higher temperatures should be applied. Since, it is nowadays well appreciated that such hot bitumens may create potential health, safety and environmental hazards, much effort is directed in this field of technology to the development of asphalt compositions which can be handled at lower temperatures.

In this respect reference can be made to the application of bitumen emulsions which are prepared by mixing a hot bitumen with an aqueous emulsifier solution. These bitumen emulsions can normally be mixed with aggregate at a temperature much lower than 140° C., in which way the above-mentioned hazards are much better controlled.

Asphalt compositions prepared from a bitumen emulsion require, however, bitumen/aggregate mixtures with relatively high void contents in order to allow the water to escape during compaction and service. Such asphalt compositions have the drawback that they are highly permeable to water and air. As a result they lose coarse aggregate from the road surface rather easily, so-called fretting of the road surface. They further lose internal cohesion which will eventually lead to collapse of the material and lack of internal stability, often visible as deformation of the road surface, i.e. rutting. Moreover, strength of these asphalts is only developed slowly.

SUMMARY OF THE INVENTION

Surprisingly, it has now been found that asphalt compositions can be produced having a good resistance against fretting and in addition a good creep and fatigue performance, by adding a hard binder component to a mixture of a soft binder component and aggregate at a relatively low temperature.

Accordingly, the present invention relates to a process for preparing a dense-graded asphalt composition which comprises adding a hard binder component to a mixture of a soft binder component and aggregate at a temperature of less than 140° C. Suitably, the temperature applied is less than 100° C.

In accordance with the present invention both an emulsified and a non-emulsified soft binder component can be used, preferably a non-emulsified soft component. When an emulsified soft binder component is used it contains a small amount of water. Suitably, less than 50% by volume, preferably less than 40% by volume.

The hard binder component is preferably added to the mixture as a powder. In that case the hard binder component can very attractively be added to the mixture at a temperature of less than 50° C., preferably at ambient temperature. If the hard binder components is used as an emulsion (or suspension), the emulsion (or suspension) suitably contains less than 50% by volume of water, preferably less than 40% by volume. In that case the hard binder component can suitably be added to the mixture of a temperature of less than 100° C., preferably at a temperature in the range of from ambient temperature to 80° C. The soft binder component can suitably be added to the aggregate also at a relatively low temperature, i.e. a temperature of less than 120° C. Suitably, the soft binder component is added to the aggregate at a temperature of at least 70° C., preferably at a temperature in the range of from 80° to 115° C., more preferably in the range of from 85° to 110° C.

DETAILED DESCRIPTION OF THE INVENTION

In the context of the present invention a hard binder component is defined as a binder component having a penetration (PEN) of less than 200 (as measured by ASTM D 5 at 25° C.). The hard binder component has suitably a penetration of less than 100, preferably less than 50, and more preferably less than 10, and a softening point of less than 100° C. (as measured by ASTM D 36), preferably less than 80° C.

In the context of the present invention a soft binder component is defined as a binder component having a penetration of more than 700 (as measured by ASTM D 5 at 25° C.). Suitably, the soft binder component has a penetration of at least 800. The person skilled in the art, however, usually characterizes such binder component not by its penetration value but its viscosity (as determined by ASTM D 2171 at 100° C.). Preferably, the soft binder component has a viscosity of less than 300 mPa.s, preferably less than 200 mpa.s (as determined by ASTM 2171 at 100° C.).

Preferably, both the hard and soft binder component are bitumen components. However, in another suitable embodiment of the present invention the hard binder component is a resin, for instance a coumarone-indene resin, and the soft binder component is a low viscous component (a flux). The resins may be any of the modified resins described in EP-B-0330281, which is hereby incorporated by reference.

The binder components may suitably contain in addition a film formation improver (e.g. butyldi-oxitol), a non-ionic emulsier (e.g. nonylphenol-ethoxylate) or an adhesion improver (e.g. an amine such as an alkylamidoamine), preferably an alkylamidoamine. Such additional compounds are preferably added to the soft binder component, and are suitably present in an amount of less than 5% wt, preferably in an amount in the range of from 0.25 to 1.0% wt, based on total binder content. Also mixtures of these additional compounds can suitably be used. In this way an even further improved resistance against fretting is established.

The bitumen components may be naturally occurring bitumens or derived from a mineral oil. Also petroleum pitches obtained by a cracking process and coal tar can be used as well as blends of bituminous materials. Examples of suitable bitumens include distillation or "straight run" bitumens, precipitation bitumens, e.g. propane bitumens, blown bitumens, e.g. catalytically blown bitumens, and mixtures thereof. Other suitable bitumen compositions include mixtures of one or more of these bitumens with extenders (fluxes) such as petroleum extracts, e.g. aromatic extracts, distillates or residues, or with oils.

The hard binder component may suitably contain a polymer modifier such as for instance a thermoplastic rubber, suitably in an amount in the range of from 1 to 10% by weight. The amounts of the hard and soft binder components used may vary between wide limits, and strongly depend on the penetration grade desired for the binder of the asphalt composition. The hard binder component can for instance suitably be present in an amount of 10 to 90% wt, based on total binder. The binder of the asphalt composition prepared in accordance with the present invention has a typical penetration for a wearing coarse binder, which suitably varies between 10 to 300, preferably between 50 to 150 (as measured by ASTM D 5 at 25° C.).

The bitumen compositions may also contain other ingredients such as fillers, e.g. carbon black, silica and calcium carbonate, stabilisers, antioxidants, pigments and solvents which are known to be useful in bitumen compositions. The asphalt compositions prepared in accordance with the present invention comprise aggregate in amounts taught in the art. The dense-graded asphalt compositions according to the present invention have low void contents, typically a 3 to 10% void content. Suitable aggregates include those normally applied in dense-graded asphalt compositions.

The present invention will now be illustrated by way of the following Examples.

EXAMPLE 1

An asphalt composition was prepared in accordance with the present invention as follows. 1.04 kg of a low viscous binder component (a Bright Stock Furfural Extract (BFE)) having a viscosity of 50 mpa.s at 100° C. (as determined by ASTM D 2171) was added to 41.17 kg of aggregate in a Hurell mill operating at a temperature of 100° C. at about 35 rpm. The aggregare consisted of 7.1% w filler (<63 µm), 36.8% w sand (63 µm–2 mm), 15.3% w stones (2–6 mm), 20.4% w stones (4–8 mm) and 20.4% w stones (8–11 mm). Subsequently, to the mixture so obtained 1.56 kg of a hard binder component was added in the form of a powder at ambient temperature. The hard binder component had a penetration of 2 (as determined by ASTM D 5 at 25° C.) and a softening point of 96° C. (as measured by ASTM D 36). The powder was prepared by powdering a blown propane bitumen having a softening point of 95° C. (as measured by ASTM D 36) in a Culatti breaking mill with a sieve size of 1 mm. Solid carbon dioxide was added to the hard bitumen lumps regularly to cool the mill and to avoid sticking of the bitumen particles produced. The dense graded asphalt composition so obtained was then poured into a mould of a slab compacter, and distributed to form a homogeneously spread loose mix. The asphalt composition was then compacted at a temperature of 100° C. After compaction the asphalt slab obtained was allowed to cool down to ambient temperature and removed from the mould. Then the asphalt slab was cut and sawn into test specimens.

EXAMPLE 2

An asphalt composition was prepared in accordance with the present invention in a similar manner as described in Example 1 except that to a mixture of 0.96 kg of the low viscous binder component and 43.96 kg of aggregate 2.78 kg of an emulsion of a hard binder component was added. The emulsion was prepared by adding 1.64 kg of a hot (180° C.) hard binder component (a Vacuum Flashed Conversion Residue) to 1.14 kg of a warm (80° C.) water/emulsion solution in a Fryma mill which was operated at a pressure of 10 atm, a temperature of 170° C. and 3000 rpm. The water/emulsion solution contained 3.5% w of a commercially available emulsifier Borresperse, 0.25% w of Guar Gum, and had a pH of 12.5. The solution was alkalified using a sodium hydroxide solution. The hard binder component had a penetration of 3 (as measured by ASTM D 5 at 25° C.) and a softening point of 90.5° C. (as measured by ASTM D 36). The final bitumen emulsion obtained had a pH of 8.6 and a viscosity of 87 mPa.s at 100° C. (as determined by ASTM D 2171) and contained 41% w water.

EXAMPLE 3

An asphalt composition was prepared in accordance with the present invention in a similar manner as described in Example 2 except that 1.33 kg of a low viscous binder (a Statfjord Short Residue) having a viscosity of 250 mPa.s at 100° C. (as determined by ASTM D 2171) was preblended at 100° C. with 13.3 g of WETFIX (an alkylamidoamine; ex Berol Nobel) and mixed with 44.22 kg of aggregate. Subsequently, 2.21 kg of an emulsion of the hard bitumen component was added. The emulsion was prepared by adding 1.18 kg of the hot hard binder component to 1.03 kg of the warm water/emulsion solution in the Fryma mill which was operated at 3000 rpm. The water/emulsion solution contained 1.5% w of a commercially available emulsifier Vinsol R, 0.2% w of Guar Gum, and had a pH of 12.6. The final bitumen emulsion obtained had a pH of 12.4 and a viscosity of 27 mPa.s at 100° C. (as determined by ASTM D 2171) and contained 46.7% w water.

TESTING EXPERIMENTS

The creep, fretting and fatigue performances of the dense-graded asphalt compositions prepared in Examples 1, 2 and 3 were then determined in respectively the dynamic creep test, the Californian abrasian test and the three point bending fatigue test, which tests are known by the skilled person. Cylindrical test specimens (diameter 101.6 mm, height 60 mm) were cut for testing the resistance to creep and fretting, while rectangular test specimens (height 40 mm, width 30 mm, length 230 mm) were sawn from the slab for fatigue testing. The cylindrical specimens were tested on creep performance in the dynamic creep test at 40° C., and on fretting performance in the Californian abrasian test at 4 and 40° C. The rectangular specimens were tested in the three point bending test on fatigue strength at a loading frequency of 40 Hz under constant stress at a temperature of 10° C. The performance data of the asphalt compositions are shown in Table 1.

It will be clear from these data that in accordance with the present invention attractive asphalt compositions can be prepared at advantageously low temperatures.

TABLE 1

|  | Dynamic creep test at 40° C. | | Californian abrasion test at | | 3 point bending beam fatigue test at 10° C. | | |
| --- | --- | --- | --- | --- | --- | --- | --- |
|  | Axial strain, [%] | Strain rate, [µm/m/ld] | 4° C., [g] | 40° C., [g] | σ6, [MPa] | δ6, [µm/m] | Smix, [GPa] |
| Example 1 | 2.57 ± 0.48 | 4.76 ± 0.11 | 20.9 ± 0.6 | 27.9 ± 0.2 | 123 | 1.56 | 12.8 ± 0.1 |

TABLE 1-continued

| | Dynamic creep test at 40° C. | | Californian abrasion test at | | 3 point bending beam fatigue test at 10° C. | | |
|---|---|---|---|---|---|---|---|
| | Axial strain, [%] | Strain rate, [μm/m/ld] | 4° C., [g] | 40° C., [g] | σ6, [MPa] | ε6, [μm/m] | Smix, [GPa] |
| Example 2 | 2.89 ± 1.21 | 6.89 ± 3.24 | 35.4 ± 1.1 | 48.4 ± 2.3 | 109 | 1.19 | 10.1 ± 1.4 |
| Example 3 | 2.33 ± 0.34 | 3.76 ± 0.23 | 24.2 ± 0.3 | 27.3 ± 0.3 | 138 | 1.39 | 9.9 ± 0.2 |
| 80/100 reference binder based Hotmix | 2.86 ± 0.10 | 4.40 ± 0.35 | 22.7 ± 0.4 | 19.8 ± 0.7 | 123 | 1.56 | 13.8 ± 0.7 |

$\sigma^6$ = permissible stress for $10^6$ fatigue cycles
$\varepsilon^6$ = permissible strain for $10^6$ fatigue cycles
Smix = Stiffness of mixture

What is claimed is:

1. A process for preparing a dense-graded asphalt composition having a void content of no more than 10 percent which comprises adding a hard binder component having a penetration of less than 50 to a mixture of a non-emulsified soft binder component having a viscosity of less than 300 mpa.s at 100° C. and a dense-graded aggregate, the adding step being conducted at a temperature of less than 50° C. if the hard binder component is added as a powder or less than 80° C. if the hard binder component is added as an emulsion or suspension, whereby the hard binder component comprises from 10 to 90 percent by weight of the total binder.

2. A process according to claim 1, wherein the hard binder component has a penetration of less than 10.

3. A process according to claim 1, wherein the soft binder component has a viscosity of less than 200 mPa.s at 100° C.

4. A process according to claim 1, wherein the hard binder component is added to the mixture as a powder.

5. A process according to claim 1, wherein the soft binder component is added to the aggregate at a temperature of less than 120° C.

6. A process according to claim 5, wherein the soft binder component is added to the aggregate at a temperature in the range of from 80° to 115° C.

7. A process according to claim 1, wherein the hard and soft binder components are bitumen materials.

* * * * *